(No Model.)  2 Sheets—Sheet 1.
W. H. WEBB.
CORN HUSKING MACHINE.
No. 527,226.  Patented Oct. 9, 1894.
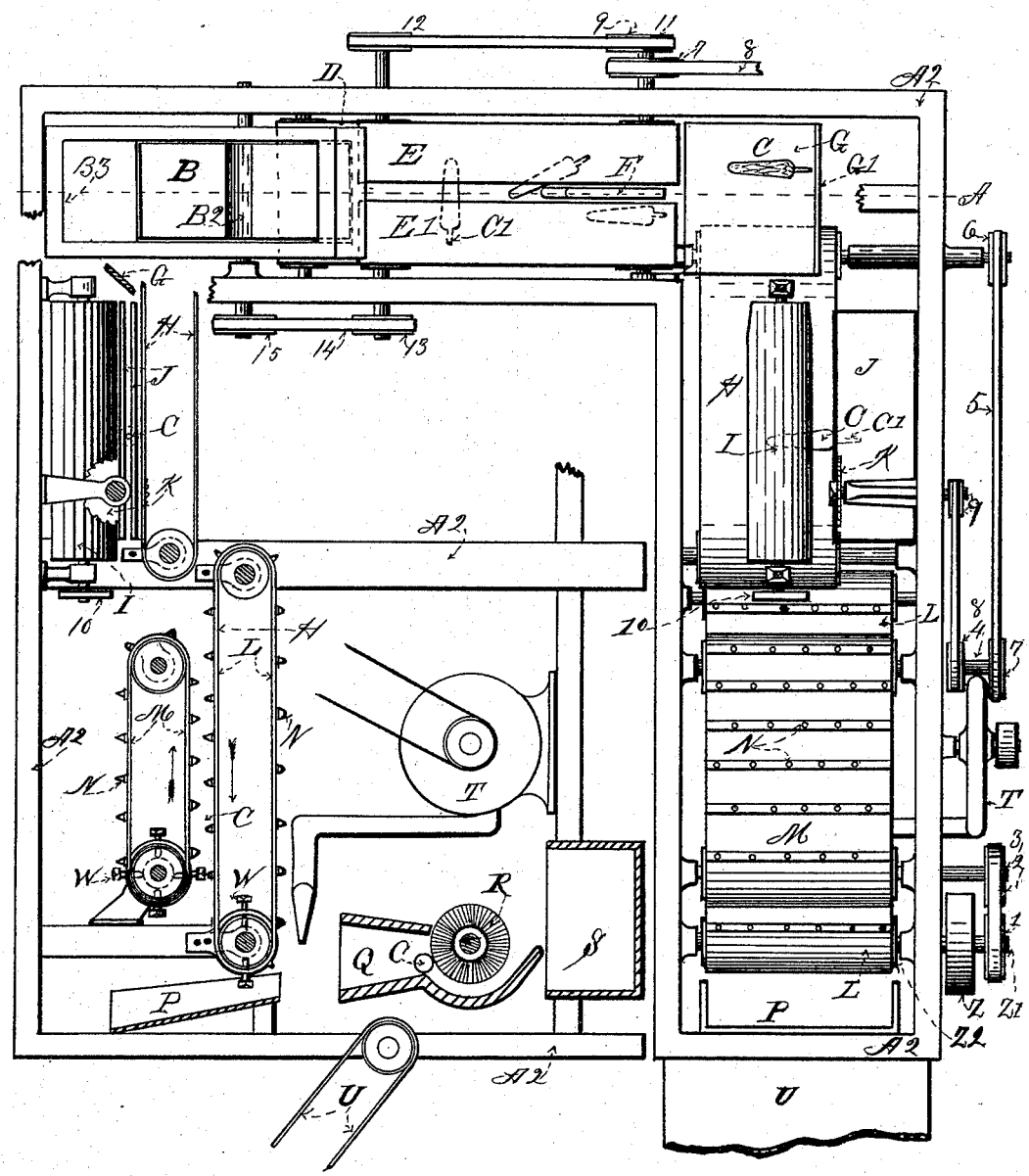
Witnesses
Geo L Union
Geo E Smith
Inventor
William H Webb
By his Attorney
Howard S Bailey (No Model.) 2 Sheets—Sheet 2.
W. H. WEBB.
CORN HUSKING MACHINE.
No. 527,226. Patented Oct. 9, 1894.
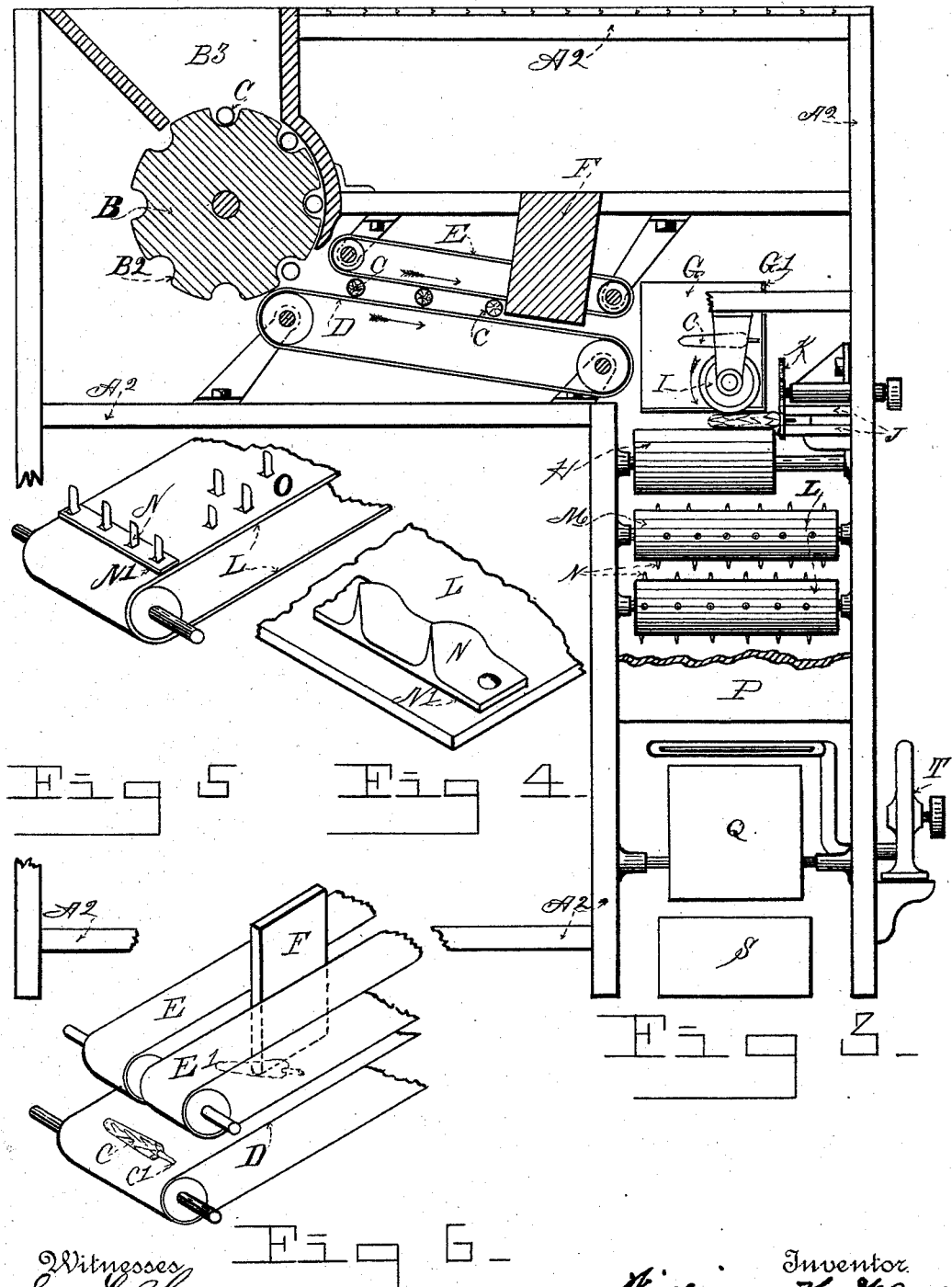
Witnesses
Geo L Herron
Geo Smith
Inventor
William H Webb
By his Attorney
Howard S. Bailey.

UNITED STATES PATENT OFFICE.

WILLIAM H. WEBB, OF LONGMONT, COLORADO.

CORN-HUSKING MACHINE.

SPECIFICATION forming part of Letters Patent No. 527,226, dated October 9, 1894.

Application filed December 9, 1893. Serial No. 493,206. (No model.)

*To all whom it may concern:*

Be it known that I, WILLIAM H. WEBB, a citizen of the United States of America, residing at Longmont, in the county of Boulder and State of Colorado, have invented certain new and useful Improvements in Corn-Husking Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for husking corn and particularly green corn used for canning purposes, and the objects of my invention are, first, to provide an automatic feeding and husking machine; second, to provide a corn husker of large capacity but simple and durable in construction; third, to provide a machine positive and efficient in operation. I attain these objects by the mechanism illustrated in the accompanying drawings and specification, in which—

Figure 1 represents a plan view of my improved corn husker with certain parts broken away. Fig. 2 represents a side elevation of my corn husking machine with portions of the frame broken away and with some parts of the machine in section, and without the automatic feeding mechanism in which condition the husk covered ears can be fed to it by hand. Fig. 3 represents an end elevation of the husking mechanism and a side elevation of the automatic feeding mechanism in section through the center of that portion of the machine on line A. of Fig. 1. Fig. 4 represents a perspective view of a fragment of a husk picker attached to a fragment of a husk picking belt. Fig. 5 represents one of the husking belts in perspective and shows two methods of attaching the pickers to it. Fig. 6 represents a perspective view of a fragmentary portion of the ear switching mechanism.

Similar letters and figures of reference refer to similar parts throughout the several views.

Referring to Fig. 1, $A^2$ represents a suitable framework for the support of the several shafts, bearings and pulleys necessary to give proper movement to the several parts.

B. represents a rotating feed roller or cylinder. It is provided with grooves or pockets $B^2$, adapted to receive from the hopper $B^3$, one ear of corn, C, at a time in each recess, which is discharged from the said grooves or pockets by centrifugal force upon the endless belt D., which is provided with suitable bearings and means for properly rotating it. Above this belt I properly and similarly arrange two endless belts, E and E', spacing them far enough apart to allow the switch board F to pass down between them close to the surface of the lower belt D, which is the same width as the two belts E and E' above it.

The belts E, E' and D are arranged close enough together to bear upon the ears of corn and carry them forward to the switch against which they strike. As the ears are always tapering, the larger end is held tightest between the belts and is carried forward round the switch and carried along by the belts. It is immaterial which way the ears lie when they are thrown upon them, as the largest end, which is always the stalk end, C', is held by greater frictional pressure and is rolled around the switch first, and they travel along with and leave the belts in this position. These three belts should travel about two hundred and fifty feet per minute, which would allow about two seconds for an ear to travel through them, as they need not be over five feet between centers. The ears are thrown from the belts onto an inclined chute G. which consists of a smooth board made as short as possible and provided with a stop strip G' at the side, so that the ears will fall on the endless belt H. as quickly as possible. This belt H. should be properly supported on drums with shafts and bearings, and provided with rotative means. Above this belt I arrange in suitable bearings and with means for rotation, a roller I. which I cover with some elastic or yielding substance, preferably rubber. The ears fall off the slide G. onto the belt H. and are carried forward by it under the roller I. which is slightly tapered at the end to allow the ears to pass under it, which revolving in the direction of the arrow, see Fig. 3, moves them to one side and against the guide blocks J. These blocks are arranged with a space between them large enough to admit the short piece of stalk at the end of the ear which varies in length, as the ears are gathered rapidly in the field and seldom broken off close to the ear. The guides are arranged so that the large end of the ear will abut against their edges and the stalks pass between them. See Fig. 3. Directly in line with the edges of the guides I arrange in suitable bearings and with rotative means a circular saw K. The roller I. holds the ears against the edges of the guides J. while at the same time they are carried forward by the belt H. and come in contact with the saw K. which cuts off the stalk and also cuts the husks free from the stalk and cob at this end, leaving them closely wrapped around the ear, but at the same time loose. The ears are then thrown on the endless husking belt L. In Fig. 3 this belt is shown considerably farther below the belt H. than in Fig. 2 to clearly illustrate the belts and mechanism in end elevation. Above this belt I arrange in adjustable bearings an additional endless belt M. Both of these belts are provided with proper rotative mechanism and the tops of both belts travel in the same direction. Consequently the lower part of the upper belt travels opposite to the top of the lower belt, as shown by the arrows. I obtain the best results by giving the belts a ratio of speed of six to one, giving the lower belt about twelve hundred feet movement per minute and the upper one about two hundred. Both belts are provided with rows of husk pickers N. which are attached transversely to the belts. On the upper belt I space the pickers about two inches apart and on the lower one about four inches apart.

The pickers can be made of malleable iron or any suitable material, and can be cast on a slight bar N', which can be riveted to the belt at each end, as shown in Fig. 4, but if preferable they can be made separately and riveted directly to the belt promiscuously, as shown at O. in Fig. 5. It is not necessary that these pickers should be over one half of an inch long. As soon as the ears strike the belt M. they are carried between the two belts and through them very quickly. As the belts travel in opposite directions the ears are rapidly rotated, and as the husks have been cut free from the cob by the saw, it is simply necessary for the pickers to tear them off. The ears and husks are thrown off the belt against the curtain or screen P. which may be made of wood, metal or canvas. In Fig. 3 it is shown partially broken away to show the belts. The ears drop from the curtain into the hopper Q, in the bottom of which I journal a circular brush R, see Fig. 2, which is provided with means for rapid rotation. The ears are rolled by the brush through the lower part of the hopper and the silk is brushed from them, leaving them perfectly clean. The ears then drop into the receptacle or box S. The husks in dropping from the belt are intercepted by a current of air from the blower T. and driven onto the conveyer belt U. and are carried by it to a silo.

It is necessary, in order to obtain the best results, to arrange the husking belts so that they may be adjusted horizontally to keep them taut, and also that the top belt be vertically adjustable. There are various ways of arranging the bearings to accomplish this. In Fig. 2, I show the bearing V. Fig. 2, arranged to be moved both ways on the top belt, and one way on the lower belt by means of screws W. arranged to move the boxes in the desired directions.

I do not confine myself strictly to the various mechanisms herein described, but reserve the right to make such modifications and changes as practice may lead me to adopt as best fitted to the economic development of a perfect husker.

I apply power to the machine through the medium of the pulley Z. see Fig. 1., and shaft Z' and drum $Z^2$, upon which the lower husking belt runs. Power is then transmitted to the upper husking belt by pulleys and belts 1, 2, and 3, and from the opposite drum shaft 4, to the belt H. by means of the belt 5, and pulleys 6 and 7. The saw may also be run by belt from the shaft 4 and pulley 8 to its mandrel 9.

The roller I. may be run by independent power from a pulley 10 on its shaft; shown in Figs. 1 and 2, also the switching belts and feeding disk by pulleys and belts 7, 8, 9, 10, 11, 12, 13 and 14, on their respective shafts, as shown. This arrangement of transmitting power from one member to another is one of several that might be employed to obtain the same results.

The capacity of this machine is very large and it might be desirable where the output of a canning factory is small to run the machine slower than here indicated, and feed it by hand, in which case Fig. 2 shows all of the machine necessary for this purpose, the automatic feeding device being dispensed with, it being simply necessary to throw the ears on the belt H or chute G, right end to, so that the saw would cut the stalk butts from them.

Having described my invention, what I claim as new, and desire to secure by Letters Patent, is—

1. The combination in a corn husker of a hopper and a feed roller provided with grooves or pockets for feeding the ears from said hopper; of a carrying belt arranged to receive the ears from said roller of two additional belts arranged side by side above said carrying belt to bear on the ears, and a pendant arranged between said upper belts to intercept the ears, the belts and pendant operating to turn and deliver said ears stalk end forward, and means for rotating said belt and roller, as specified.

2. The combination in a corn husking machine of an ear receiving belt and a rotating roller longitudinally arranged over said belt to bear on said ears and adapted to feed them laterally at the same time said belt is feeding them forward; guides arranged parallel with said belt to arrest the lateral movement of the ears, and separated to admit between them the ear stalk; a saw arranged adjacent to the said guides and interposed in the path of the stalk for cutting the stalk from the ear, and means for rotating said mechanism, as herein set forth.

3. In a corn husking machine the combination with a cleaning device comprising a rotating brush and a concentric casing and hopper arranged to receive ears from the husking mechanism and guide them between said casing and brush, whereby any remaining husks may be removed from them, and means for rotating said brush, of the belts L. and M. rotating in opposite directions and provided with projecting teeth or cutters adapted to remove the husks from said ears, as set forth.

4. The combination in a corn husking machine of a hopper and a rotative feed roller provided with grooves and pockets adapted to feed the ears from the hopper; endless carrying belts arranged to receive between them the ears from said roller, and a depending lever arranged to intercept the ears between said belts whereby they may be turned stalk end forward in the belts, and a chute arranged to receive the ears from said belts with an endless carrying belt arranged to receive the ears from said chute; a roller journaled over said belt adapted to feed said ears laterally on said belt against a guide; a guide provided with a central opening to receive the stalks of the ears and a saw journaled in juxtaposition to said guide and in the path of the end of the ear, operating to cut the stalk and husks free from the end of the ear, and means for driving said mechanism, as set forth.

5. The combination in a corn husker of a carrying belt arranged to receive unhusked ears; a rotary roller arranged longitudinally over said belt to bear on the ears and rounded or tapered at the ear receiving end, and operating to feed said ears transversely on said belt; a guide arranged parallel to said belt to receive the lateral abutment of said ears provided with a central groove in its edge for the reception of the ear stalk, and a saw journaled in juxtaposition to said guide to intercept the ears and cut the stalk and the roots of the husks from them, with a second carrying belt provided with numerous short projecting points or teeth arranged to receive the ears from the first mentioned belt, and an additional belt moving in an opposite direction provided also with projecting points or teeth arranged above said belt to contact with the ears and operating to give them a rotative motion as they are carried forward by the lower belt, and to separate the husks from them by impingement of the projections against them, and means for rotating said mechanisms, as specified.

6. In a corn husking mechanism the combination of a receiving and carrying belt, a roller rotating at right angles to the forward movement of said belt adapted to feed them laterally against a guide for a predetermined distance as they are carried forward by said belt; a guide secured parallel with said conveying belt provided with a recess for the reception of the ear stalks; a rotary cutter mounted between the belt and said guide and in the path of the stalk end of the ear, with endless belts arranged to receive between them the ears from said carrying belt and provided with projecting cutters adapted to impinge and pierce the husks of said ears, means for rotating said belts in opposite directions and at different ratios of speed whereby the ears may be rotated against the cutters and at the same time carried forward, and means for adjusting said belts vertically or horizontally; a blower arranged to deliver a current of air across the path of the ears and husks as they fall from the last mentioned belts, and a conveyer arranged to receive said husks and transport them from the machine; a hopper or chute arranged to receive the ears from said belts; a rotary brush journaled in a concentric casing below said hopper or chute in the path of said ears, and means for driving the several mechanisms, as herein set forth.

7. The combination with a hopper and a feed roller, belts adapted to receive the ears between them from said roller, a pendant arranged to intercept the ears between said belts and switch them from a transverse to a longitudinal position; a chute to receive the ears from said belts; a carrying belt arranged to receive the ears from said chute; a roller journaled to rotate against the ears and feed and hold them endwise against a guide as they are carried forward by said belt; a guide arranged parallel with said belt to receive the endwise movement of said ears provided with a recess in its edge adapted to receive the ear stalk; and a saw journaled between said guide and belt in the path of the ends of the ears, and two belts arranged to receive between them the ears from the last named belt, and arranged to rotate in opposite directions and at different ratios of speed, and provided with projecting teeth, points or cutters adapted to impinge the husks and force them from the ears; of a blower arranged to separate the husks from the ears as they leave the belts, and a hopper arranged to receive the said ears; a rotary brush and a concentric casing arranged below said hopper in the path of the ears adapted to clean them, and means for driving the several mechanisms, substantially as set forth.

8. The combination in a corn husker with a hopper and a feeding roller, of endless conveying belts arranged to receive the ears from said roller, a pendant, and means for switching the ears stalk end forward on said belt; a second conveying belt arranged to receive the ears from the first named belt, a roller adapted to feed and hold the ears against the guide, a cutter adapted to separate the stalk from the ear and loosen the husks at the stalk end, and a mechanism for separating the husks from the ears consisting of two endless belts arranged one above the other to receive the ears between them transversely, and arranged to rotate in opposite directions and at different ratios of speed, and to contact with them and rotate them as they are carried forward by the faster belt; of projecting teeth, or cutters attached to said belts adapted to impinge, pierce, and thereby remove the husks from said ears as they pass in opposite directions by them, all arranged as and for the purpose herein set forth and described.

In testimony whereof I affix my signature in presence of two witnesses.

WILLIAM H. WEBB.

Witnesses:
 IRA L. HURON,
 GEO. SMITH.